United States Patent
Voiles et al.

(10) Patent No.: US 11,919,623 B2
(45) Date of Patent: Mar. 5, 2024

(54) RUDDER AND BRAKE PEDAL ASSEMBLY

(71) Applicants: Jeffrey T. Voiles, Niles, IL (US); Darryl S. Stachniak, Chicago, IL (US); Roy Romana, Chicago, IL (US)

(72) Inventors: Jeffrey T. Voiles, Niles, IL (US); Darryl S. Stachniak, Chicago, IL (US); Roy Romana, Chicago, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/689,435

(22) Filed: Mar. 8, 2022

(65) Prior Publication Data
US 2022/0185453 A1    Jun. 16, 2022

Related U.S. Application Data

(63) Continuation of application No. 16/672,164, filed on Nov. 1, 2019, now Pat. No. 11,396,362.

(51) Int. Cl.
*B64C 13/04* (2006.01)
*B64C 13/10* (2006.01)
*B64C 13/18* (2006.01)

(52) U.S. Cl.
CPC ............ *B64C 13/044* (2018.01); *B64C 13/10* (2013.01); *B64C 13/18* (2013.01)

(58) Field of Classification Search
CPC .............................. B64C 13/06; B64C 13/044
See application file for complete search history.

(56) References Cited

U.S. PATENT DOCUMENTS

| 2,585,688 | A | 2/1952 | Saulner |
| 3,576,302 | A | 4/1971 | Palfreyman |
| 5,056,742 | A | 10/1991 | Sakurai |
| 5,552,807 | A | 9/1996 | Hayes et al. |

(Continued)

FOREIGN PATENT DOCUMENTS

| EP | 1 873 057 A1 | 1/2008 |
| EP | 3 456 626 A1 | 3/2019 |

(Continued)

OTHER PUBLICATIONS

U.S. Appl. No. 16/672,164, filed Nov. 1, 2019.

*Primary Examiner* — Richard G Davis
(74) *Attorney, Agent, or Firm* — Reinhart Boerner Van Deuren P.C.

(57) ABSTRACT

An airplane rudder and brake pedal assembly includes a rudder arm assembly having one rudder arm with first upper and lower arm portions, and another rudder arm with second upper and lower arm portions. The rudder arm assembly is assembled to a beam at an intersection of the first upper and lower arm portions, and an intersection of the second upper and lower arm portions. The first and second rudder arms are configured to rotate about the beam at the intersection. The rotation of the first and second rudder arms is configured to adjust control surfaces that control a yaw axis of the airplane. A brake pedal is attached to the first and second lower arm portions. Rotation of the brake pedal brakes the airplane. A rotary sensor is assembled to the brake pedal and the lower arm portion, and configured to determine an extent of the brake pedal rotation.

11 Claims, 9 Drawing Sheets

(56) References Cited

U.S. PATENT DOCUMENTS

| | | | |
|---|---|---|---|
| 5,725,184 A | 3/1998 | Kang et al. | |
| 6,923,405 B2 | 8/2005 | Cline et al. | |
| 6,981,409 B2 | 1/2006 | Huynh | |
| 8,353,484 B2 | 1/2013 | Gardner | |
| 9,261,894 B2 | 2/2016 | Stachniak | |
| 9,764,830 B2 | 9/2017 | Yates et al. | |
| 9,856,015 B2 | 1/2018 | Saint-Marc et al. | |
| 10,196,130 B2 | 2/2019 | Gemmati et al. | |
| 2002/0020247 A1 | 2/2002 | Kojima et al. | |
| 2007/0205333 A1* | 9/2007 | Boczar | B64C 27/68 244/220 |
| 2012/0025029 A1 | 2/2012 | Szulyk et al. | |
| 2012/0025030 A1 | 2/2012 | Stachniak et al. | |
| 2012/0025031 A1 | 2/2012 | Stachniak et al. | |
| 2012/0097800 A1 | 4/2012 | Burroughs et al. | |
| 2013/0105634 A1 | 5/2013 | DeCraene et al. | |
| 2014/0077025 A1* | 3/2014 | Yates | B64D 43/00 244/17.11 |
| 2014/0131523 A1* | 5/2014 | Carner | B64C 13/044 244/235 |
| 2014/0251066 A1 | 9/2014 | Stachniak | |
| 2015/0203188 A1 | 7/2015 | Piotrowski et al. | |
| 2016/0348772 A1* | 12/2016 | Petrou | B64C 13/044 |
| 2017/0113784 A1* | 4/2017 | Guering | B64C 13/341 |
| 2017/0166296 A1 | 6/2017 | Guering et al. | |
| 2017/0174324 A1 | 6/2017 | Carner et al. | |
| 2017/0253317 A1 | 9/2017 | Elliott | |
| 2017/0283037 A1 | 10/2017 | Guering et al. | |
| 2018/0339763 A1* | 11/2018 | Marini | B64C 13/044 |
| 2019/0359318 A1* | 11/2019 | Guering | G05G 1/36 |

FOREIGN PATENT DOCUMENTS

| | | |
|---|---|---|
| FR | 3 049 574 A1 | 10/2017 |
| FR | 3 031 083 B1 | 12/2017 |
| WO | WO 2014/075023 A1 | 5/2014 |
| WO | WO 2014/106428 A1 | 7/2014 |
| WO | WO 2018/156618 A1 | 8/2018 |

* cited by examiner

RUDDER AND BRAKE PEDAL ASSEMBLY

CROSS-REFERENCE TO RELATED PATENT APPLICATIONS

This patent application is a continuation of co-pending U.S. patent application Ser. No. 16/672,164, filed Nov. 1, 2019, the entire teachings and disclosure of which are incorporated herein by reference thereto.

FIELD OF THE INVENTION

This invention generally relates to a rudder and brake pedal assembly for control of an airplane.

BACKGROUND OF THE INVENTION

Typically, piloted airplanes have certain control surfaces including horizontal stabilizers or ailerons, and vertical stabilizers or rudders to control movement of the airplane during flight. These control surfaces are also used to trim, or stabilize, the airplane during flight. Also, like automobiles, airplanes also include braking systems to control movement of the plane while on the ground. Generally, these braking and control surfaces, including the rudder, are operated by various mechanical links and cables or hydraulic or electro-mechanical actuators which are operated by the pilot and allow the pilot to control the airplane's flight path. These mechanical linkages and cables or electrical connections typically extend under the flight deck from the location of the landing gear and control surfaces to the airplane cockpit. The aforementioned rudder and braking system are typically operated by pedals located under the cockpit instrument panel.

Embodiments of the invention detailed below represent an improvement to the state of the art with respect to airplane control systems. These and other advantages of the invention, as well as additional inventive features, will be apparent from the description of the invention provided herein.

BRIEF SUMMARY OF THE INVENTION

In one aspect, embodiments of the invention provide a rudder and brake pedal assembly for an airplane. The assembly has a rudder arm assembly with a first rudder arm with a first upper arm portion coupled to a first lower arm portion. The rudder arm assembly also includes a second rudder arm with a second upper arm portion coupled to a second lower arm portion. The rudder arm assembly is assembled to a beam at an intersection of the first upper and lower arm portions, and at an intersection of the second upper and lower arm portions. The first and second rudder arms are configured to rotate about the beam at the intersection. The rotation of the first and second rudder arms is configured to adjust those control surfaces used to control a yaw axis of the airplane. A brake pedal is attached to an end of at least one of the first and second lower arm portions at an attachment point. Rotation of the brake pedal at the attachment point operates the wheel brakes of the airplane. A rotary sensor is assembled to both the brake pedal and the lower arm portion at the attachment point. The rotary sensor is configured to determine an extent of the brake pedal rotation.

In a particular embodiment, the rotary sensor is a fixed link rotary sensor having a sensor housing fixed to the lower arm portion at the attachment point, and an input lever coupled to the brake pedal and also coupled to the sensor input shaft such that rotation of the brake pedal causes the input lever to rotate relative to the sensor housing.

In an alternate embodiment, the rotary sensor is an offset-sensor rotary sensor with a sensor housing with an attached sector gear. The sensor housing is fixed to the brake pedal. A mating gear is fixed to the lower arm portion. The mating gear engages the sector gear such that rotation of the brake pedal causes the mating gear to travel a distance along the sector gear, where the distance is proportional to the extent of the brake pedal rotation.

In yet another alternate embodiment, the rotary sensor is an on-axis rotary sensor with a sensor with an input gear and an idler gear fixed to the lower arm portion at the attachment point. An internal sector gear is fixed to the brake pedal. The idler gear is disposed between and engages the input gear, on a first side, and engages the internal sector gear on a second side opposite the first side. Rotation of the brake pedal causes the internal sector gear to travel a distance along the idler gear and the input gear, where the distance is proportional to the extent of the brake pedal rotation.

In certain embodiments, the rudder and brake pedal assembly include a housing configured to house a trim mechanism, a bellcrank, a centering mechanism, a load-sensing assembly, and a damper assembly. In more particular embodiments, the housing includes means for attachment of the rudder and brake pedal assembly to either a cockpit floor, a cockpit bulkhead, or directly under a cockpit instrument panel.

The aforementioned brake pedal may be biased to a normal position by one or more springs attached to the brake pedal, and there may be a third spring coupled to the rotary sensor. The third spring is configured to bias the brake pedal to the normal position in the event of a failure of the one or more springs.

In a further embodiment, the rudder and brake pedal assembly also includes a trim mechanism operated by a motor. The trim mechanism may be configured to control a neutral position of the rudder arm assembly, therefore controlling the control surfaces used to trim the airplane. As used in this application, the "neutral position" for the rudder arm assembly refers to that position of the brake pedals in which no control surfaces are being affected or controlled by pilot operation of the pedal assembly. This neutral position is also typically the starting position of the brake pedals when no force or pressure has been placed on either brake pedal. The trim mechanism may also include a first worm screw configured to rotate synchronously to drive a first worm wheel, wherein movement of the first worm wheel adjusts the control surfaces used to trim the airplane. In a more particular embodiment, the trim mechanism has a second redundant worm screw parallel to the first worm screw and a second redundant worm wheel parallel to the first worm wheel. Movement of the second worm screw adjusts the control surfaces used to trim the airplane.

The rudder and brake pedal assembly may also include a centering mechanism configured to return the first and second rudder arms and attached brake pedals to a neutral position determined by the trim mechanism. Some embodiments of the centering mechanism have one or more springs which bias the first and second rudder arms and attached brake pedals to the neutral position. Some embodiments include a trim mechanism to bias the centering mechanism, therefore biasing the first and second rudder arms and attached brake pedals to an offset neutral position.

Embodiments of the rudder and brake pedal assembly include a bellcrank configured to rotate about a centering hub shaft. The bellcrank has a first end on a first side of the centering hub shaft, and a second end on a second side of the centering hub shaft opposite the first side. The first end is operatively coupled to the first upper arm portion and the second end is operatively coupled to the second upper arm portion. The bellcrank operates such that when the first rudder arm is rotated in a first direction, the second rudder arm is rotated to the same degree as the first rudder arm but in a second direction opposite the first direction.

Embodiments of the rudder and brake pedal assembly further include a load-sensing assembly having one or more sensors to sense the forces generated by operation of the rudder arm assembly via the brake pedal. Moreover, in some embodiments, the load-sensing assembly includes a load-sensing transducer.

In some embodiments of the invention, a brake pedal assembly includes the brake pedal, a portion of the rotary sensor, and a brake sensor with a sensor cord and connector such that by connecting or disconnecting the sensor cord and connector, the entire brake pedal assembly can be attached to or removed from the lower arm portion. The rudder and brake pedal assembly may also include a damper assembly configured to prevent overshoot of the brake pedal when returning the brake pedal to a neutral position.

Embodiments of the rudder and brake pedal assembly further include an interconnect clevis for connecting the rudder and brake pedal assembly to a second adjacent rudder and brake pedal assembly. The interconnect clevis operates such that the rotation of the first or second rudder arm of the rudder and brake pedal assembly causes the same rotation of the corresponding rudder arm on the second rudder and brake pedal assembly. The rudder arm assembly may be assembled to a translation block configured to move along a guide path, allowing for adjustment of the first and second rudder arms to adjust a position of the brake pedal. Furthermore, movement of the translation block is effected via a hand wheel, a motor, or a release latch.

In another aspect, embodiments of the invention provide a rudder and brake pedal assembly for an airplane. The rudder and brake pedal assembly has a rudder arm assembly with a first rudder arm with a first upper arm portion coupled to a first lower arm portion, and has a second rudder arm with a second upper arm portion coupled to a second lower arm portion. The rudder arm assembly is assembled to a beam at an intersection of the first upper and lower arm portions, and at an intersection of the second upper and lower arm portions. The first and second rudder arms are configured to rotate about the beam at the intersection. The rotation of the first and second rudder arms is configured to adjust those control surfaces used to control a yaw axis of the airplane. A bellcrank is configured to rotate about a centering hub shaft. The bellcrank has a first end on a first side of the centering hub shaft, and a second end on a second side of the centering hub shaft opposite the first side. The first end is operatively coupled to the first upper arm portion and the second end is operatively coupled to the second upper arm portion. The bellcrank operates such that when the first rudder arm is rotated in a first direction, the second rudder arm is rotated to the same degree as the first rudder arm but in a second direction opposite the first direction. The bellcrank is further configured to maintain a fixed position during adjustment of the rudder arm assembly to adjust a position of a brake pedal attached to an end of at least one of the first and second lower arm portions.

In certain embodiments, the rudder and brake pedal assembly also includes an interconnect clevis for connecting the rudder and brake pedal assembly to a second adjacent rudder and brake pedal assembly. The interconnect clevis operates such that the rotation of the first or second rudder arm of the rudder and brake pedal assembly causes the same rotation of the corresponding rudder arm on the second rudder and brake pedal assembly. The interconnect clevis is further configured to maintain a fixed position during adjustment of the rudder arm assembly to adjust the position of the brake pedal.

In yet another aspect, embodiments of the invention provide a rudder and brake pedal assembly for an airplane. The rudder and brake pedal assembly includes a brake pedal assembly having a brake pedal and position sensor to sense a position of the brake pedal. The brake pedal is attached to a rudder arm. A position-sensing mechanism senses a position of the rudder arm. A trim mechanism is coupled to the rudder arms. The trim mechanism is configured to adjust those control surfaces used to trim the airplane. A centering mechanism is configured to return the rudder arms and attached brake pedals to a neutral position. The trim mechanism, centering mechanism, and position-sensing mechanism are integrated into a single device configured to be positioned below a cockpit instrument panel.

In a particular embodiment, the rudder and brake pedal assembly includes one of a damper assembly configured to prevent overshoot of the brake pedal when returning the brake pedal to a neutral position, and a load-sensing assembly having one or more sensors to sense the forces generated by a trim mechanism when adjusting the control surfaces used to trim the airplane.

In another embodiment, the rudder and brake pedal assembly includes one of a friction assembly configured to provide tactile feedback, through the rudder arm assembly, to a pilot of the airplane, and an autopilot activation mechanism for activating an autopilot feature. In a further embodiment, the rudder and brake pedal assembly also includes a housing configured to house the position-sensing mechanism, the centering mechanism, and the trim mechanism, the housing including means for attachment of the rudder and brake pedal assembly to either a cockpit floor, a cockpit bulkhead, or directly below the cockpit instrument panel.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
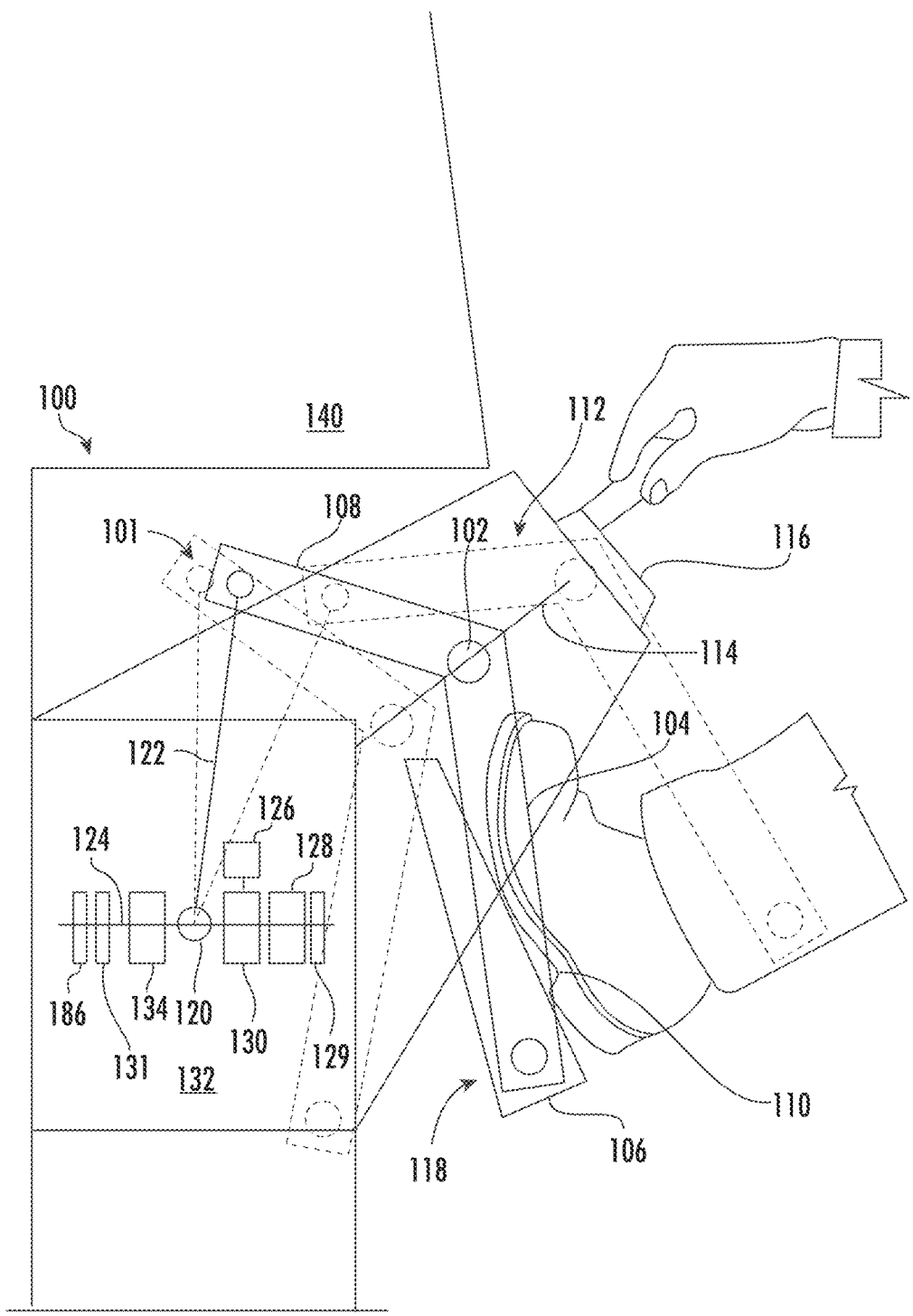
FIG. 1 is a schematic illustration of a rudder and brake pedal assembly for an airplane, constructed in accordance with an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIGS. 1-4 are schematic diagrams of a rudder and brake pedal assembly 100 for an airplane, constructed in accordance with an embodiment of the invention. In the embodiments shown, the rudder and brake pedal assembly 100 includes a rudder arm assembly 101 with a pair of rudder arms 104 connected to a horizontal beam 102. Typically, the two rudder arms 104 are parallel, each rudder arm 104 having a foot-operated brake pedal 106 attached at an end of the rudder arm 104. As the foot of the pilot presses down on one of the brake pedals 106, the corresponding rudder arm 104 rotates about the horizontal beam 102. The rotation of these rudder arms 104 about the horizontal beam 102 operates to adjust those control surfaces used to control a yaw axis of the airplane.

Each rudder arm 104 has an upper arm portion 108 coupled to a lower arm portion 110. In the embodiments shown, each rudder arm 104 is assembled to the horizontal beam 102 at an intersection of the upper arm portion 108 and lower arm portion 110. In a particular embodiment, the rudder arm assembly 101 includes a translation block 112 attached to, and positioned between the two rudder arms 104. The translation block 112 is assembled onto one or more guide arms 114 that follows a guide path for the translation or movement of the translation block and attached rudder arms 104. The translation block 112 is configured to move in either direction along the guide path defined by the one or more guide arms 114 as shown in dashed lines in FIG. 1 in the uppermost and lowermost positions. The one or more guide arms 114 allow for the translation or adjustment of the two rudder arms 104 to adjust a position of the brake pedals 106 for the pilot or co-pilot. In a particular embodiment, movement of the translation block 112 and two rudder arms 104 is affected via a hand wheel 116, a release latch, or a motor, such as a stepper motor for example. While the one or more guide arms 114 are shown as linear in the drawings, in alternate embodiments, the one or more guide arms 114 and associated guide paths are curvilinear.

Figure 9:
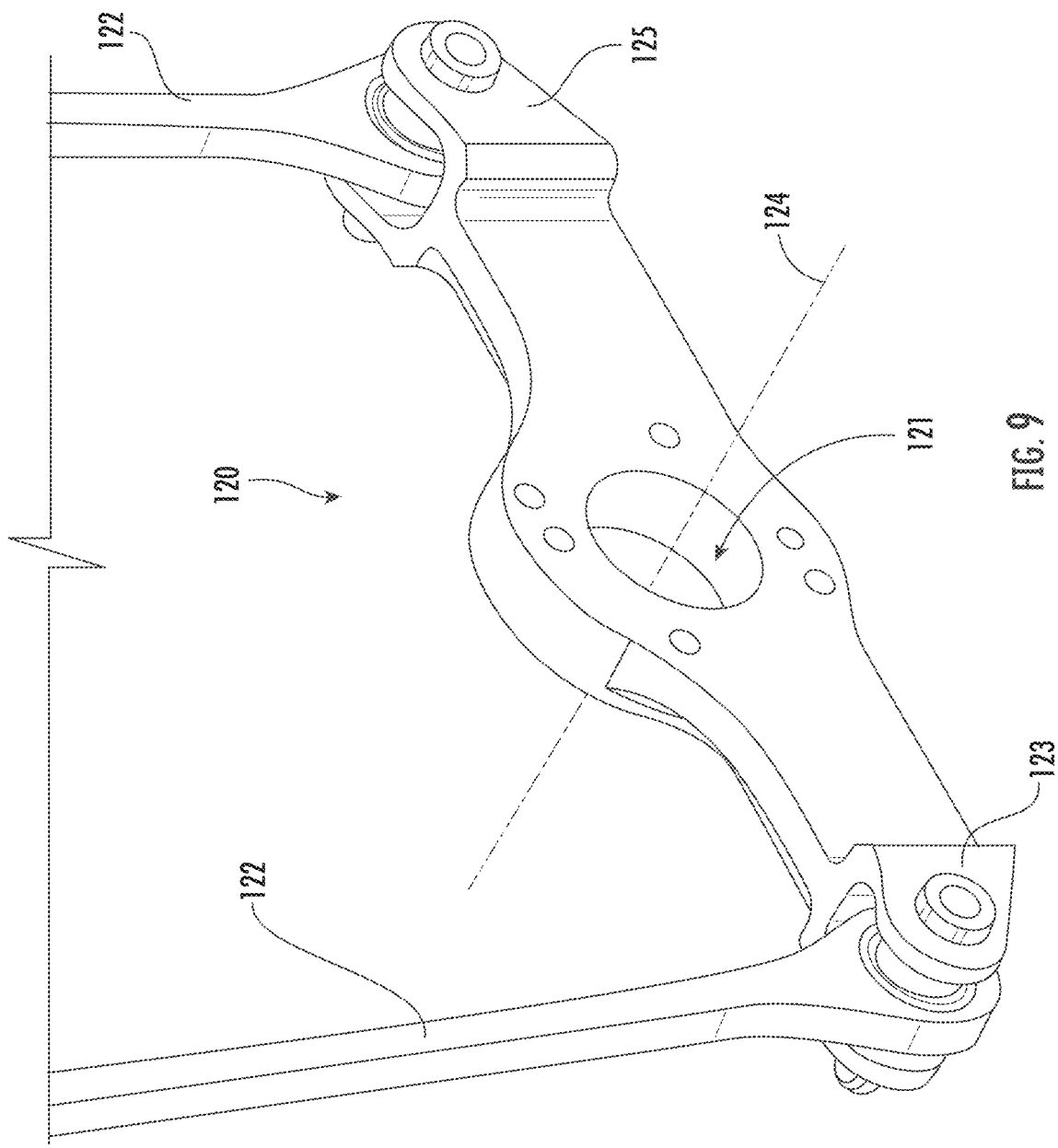
FIG. 9 is an isometric view of a bellcrank used in a rudder and brake pedal assembly for an airplane, constructed in accordance with an embodiment of the invention.

In certain embodiments, each rudder arm 104 is attached via a link 122 to a bellcrank 120. The bellcrank 120, as shown in FIG. 9, has a central opening 121 via which it is assembled onto a centering hub shaft 124 and configured to rotate about the centering hub shaft 124. The bellcrank 120 has a first end 123 on a first side of the centering hub shaft 124, and a second end 125 on a second side of the centering hub shaft 124 opposite the first side. The first end 123 of the bellcrank 120 is operatively coupled to the upper arm portion 108 of the first rudder arm 104 via the first link 122, while the second end 125 of the bellcrank 120 is operatively coupled to the upper arm portion 108 of the second rudder arm 104 via the second link 122.

The bellcrank 120 operates such that when the first rudder arm 104 is rotated in a first direction (e.g., due to the pilot pressing down on one of the foot-operated brake pedals 106, the second rudder arm 104 is rotated to the same degree as the first rudder arm 104 but in the opposite direction. Thus, the bellcrank 120 ensures that when one of the brake pedals 106 moves some distance forward, the other brake pedal 106 moves the same or a similar distance backward. In a particular embodiment, the bellcrank 120 is further configured to maintain a fixed position during adjustment of the rudder arm assembly 101 to adjust a position of the brake pedal 106 attached to an end of at least one of the first and second lower arm portions 110. This may be seen from the dashed lines showing the rudder arm assembly 101 in its uppermost and lowermost positions (in addition to the mid-position shown in solid lines) in FIG. 1. As the rudder arm assembly 101 moves along the one or more guide arms 114, the angle of the upper arm portion 108 and lower arm portion 110 in their quiescent state varies due to the first link 122 and second link being attached to the bellcrank 120 (see FIG. 9), which is maintained in a fixed position on the centering hub shaft 124. In designing the bellcrank 120 to remain in a fixed position even during adjustment of the brake pedal position (see dashed lines in FIG. 1, the design of the rudder and brake pedal assembly 100 can be simplified and less costly to manufacture than standard assemblies of this type.

Moving the brake pedals 106, as described above, operates to control a yaw axis of the airplane to steer control turning of the airplane. When one of the brake pedals 106 is depressed and then released, a centering mechanism 130 operates to return the first and second rudder arms 104 and attached brake pedals 106 to a neutral position. In this context, "neutral position" refers to that position of the brake pedals 106 in which no control surfaces are being affected or controlled by the trim mechanism 126, or the rudder arm assembly 101. This neutral position is also typically the starting position of the brake pedals 106 in which no pressure is placed on either of the brake pedals 106.

Figure 8:
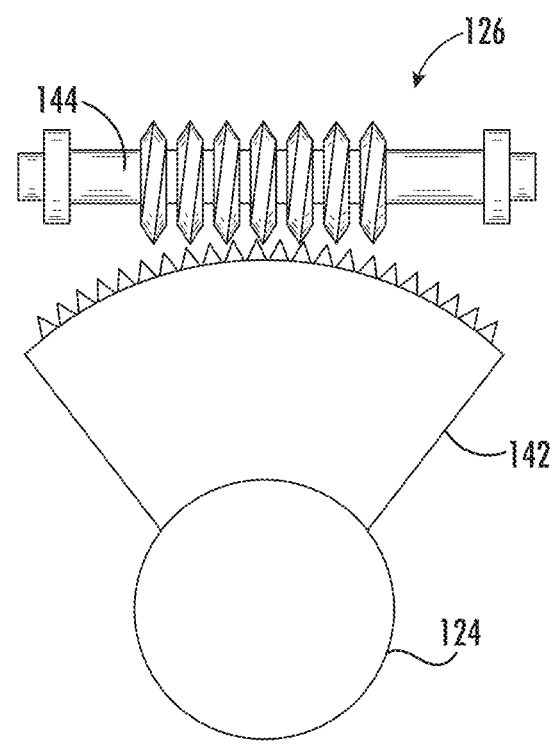
FIG. 8 is a schematic illustration of a worm screw and worm wheel used in a trim mechanism, in accordance with an embodiment of the invention.

To stabilize the airplane in flight, the pilot may accomplished this via a trim mechanism 126. The trim mechanism 126 is typically operated a motor, such as a stepper motor for example, though other motor types are envisioned. The trim mechanism 126 operates to control movement of control surfaces, such as the rudder, used to trim the airplane. In a particular embodiment shown in the schematic illustration of FIG. 8, the trim mechanism 126 includes a first worm wheel 142 assembled onto the centering hub shaft 124. The first worm wheel 142 engages a first worm screw 144. The first worm screw 144 is configured to rotate synchronously to drive the first worm wheel 142, wherein movement of the first worm screw 144 and worm wheel 142 adjusts the control surfaces used to trim the airplane. In a more particular embodiment, the trim mechanism 126 has a second redundant worm wheel 142 assembled onto the centering hub shaft 124. The second redundant worm wheel 142 is identical and parallel to the first worm wheel 142. The trim mechanism 126 also has a second redundant worm screw 144 identical and parallel to the first worm screw 144. In the event of a failure of the first worm screw 144 and worm wheel 142, movement of the second worm screw 144 and second worm wheel 142 adjusts the control surfaces used to trim the airplane in the same manner as the first worm screw 144 and worm wheel 142.

When one of the brake pedals 106 is pressed, a centering mechanism 130 returns the brake pedals 106 to the neutral position. In a particular embodiment, the centering mechanism 130 is adjacent the bellcrank 120 on the centering hub shaft 124. Certain embodiments of the centering mechanism 130 have either one or more springs which bias the two rudder arms 104 and attached brake pedals 106 to the neutral position, and may include a trim mechanism 126 to bias the centering mechanism 130, therefore biasing the two rudder arms 104 and attached brake pedals 106 to an offset neutral position.

A load-sensing assembly 128 is positioned adjacent the centering mechanism 130 on the centering hub shaft 124. The load-sensing assembly 128 has one or more sensors to sense the forces generated by operation of the rudder arm assembly 101 when operating the control surfaces used to control the yaw axis of the airplane. In a particular embodiment, the load-sensing assembly 128 includes a load-sensing transducer. Along with the load-sensing assembly 128, certain embodiments include a position-sensing mechanism 129 for sensing a position of the rudder arms 104. Based on the determination made by the position-sensing mechanism 129, the proper control signal is provided to the control surface that controls the yaw axis of the airplane. In certain embodiments, the position-sensing mechanism 129 is a rotary variable differential transformer (RVDT).

In another embodiment of the invention, the rudder and brake pedal assembly 100 includes a damper assembly 134 configured to prevent overshoot of the brake pedal 106 when returning the brake pedal 106 to the neutral position. In some embodiments, the neutral position may be determined by the trim mechanism 126. A friction assembly 131 acts to provide tactile feedback, through the rudder arm assembly 101, to a pilot of the airplane. The friction assembly 131 may be further configured to hold the brake pedals 106 in a current position, for example, in the event of a failure of the centering mechanism 130.

Figure 2:
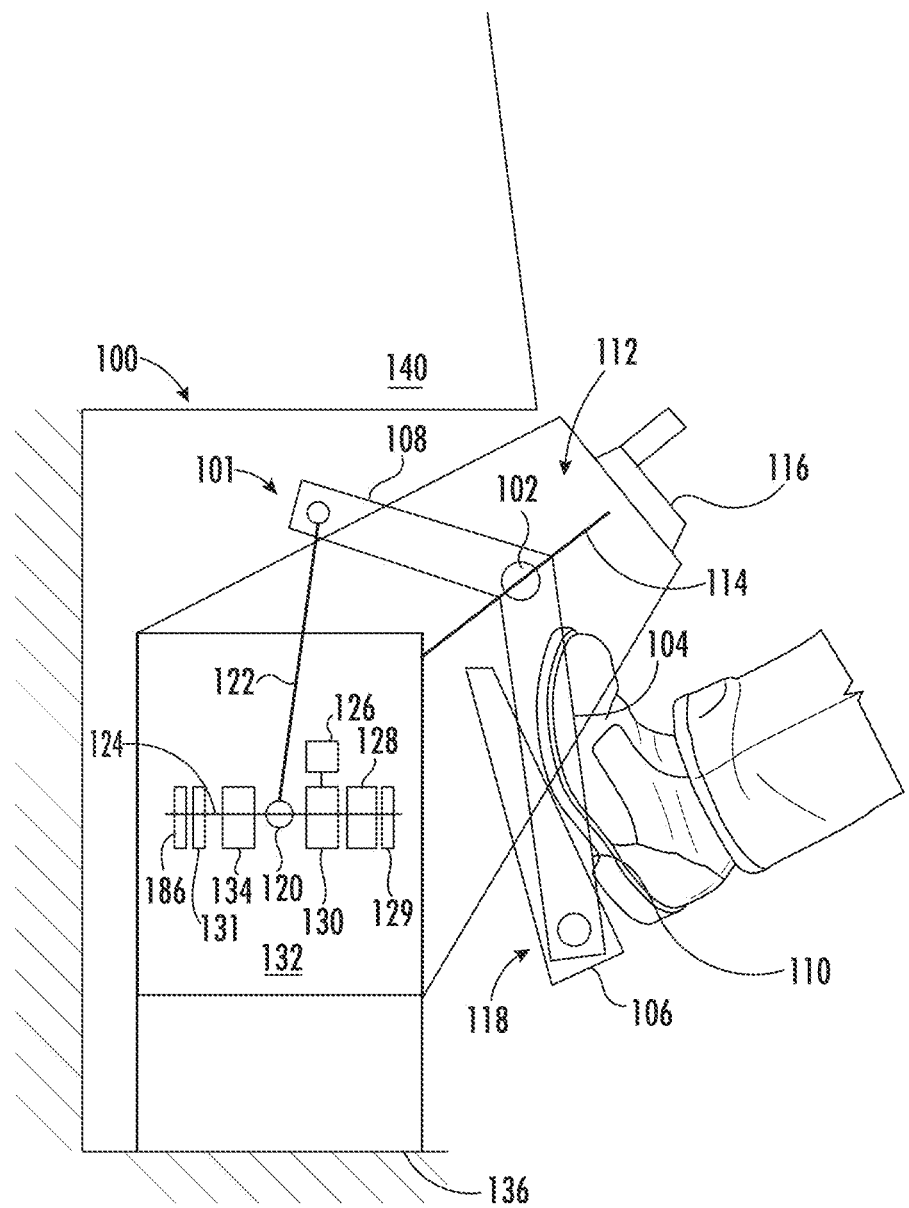
FIG. 2 is a schematic illustration of the rudder and brake pedal assembly mounted on the cockpit floor of the airplane, according to an embodiment of the invention.
Figure 3:
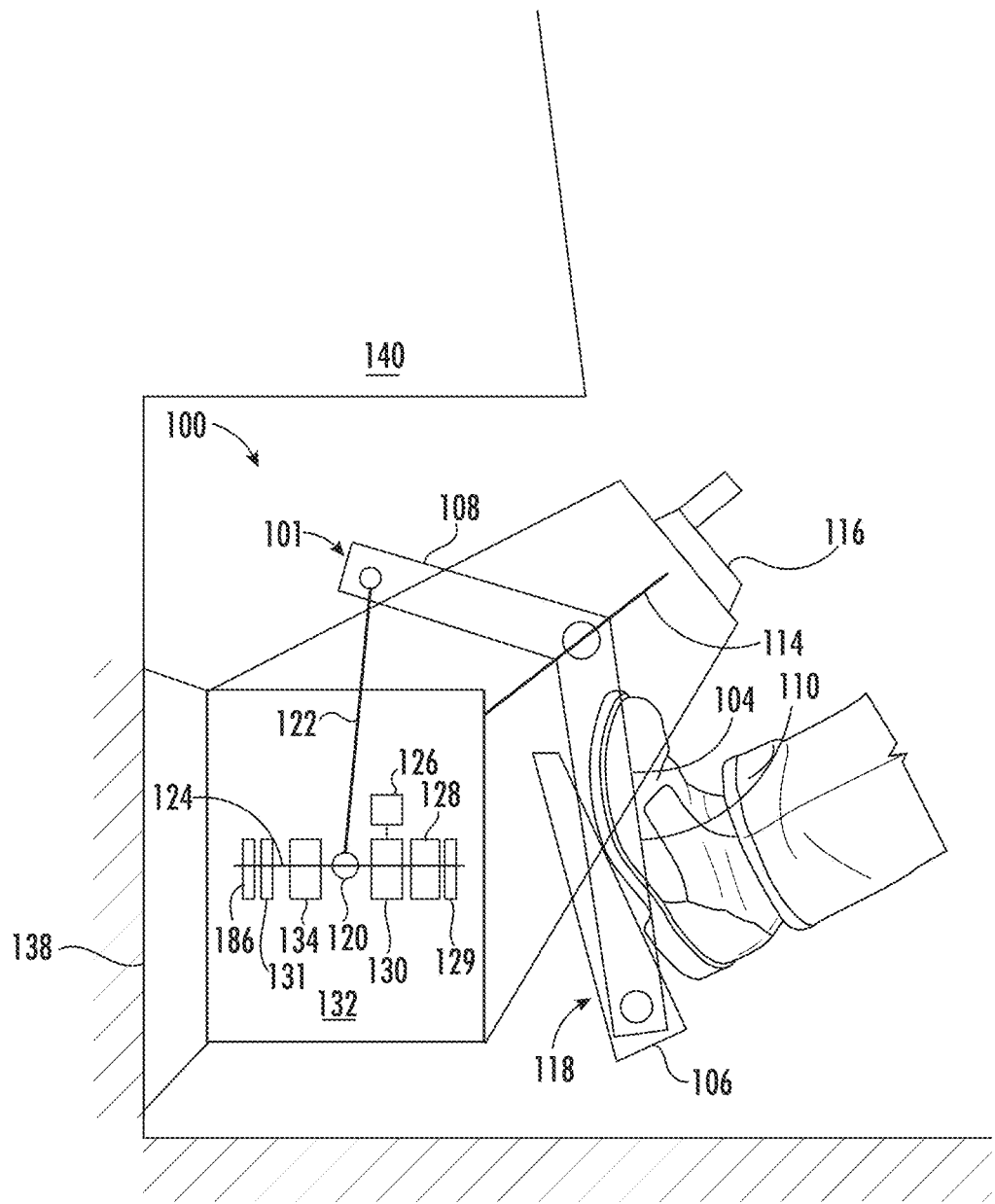
FIG. 3 is a schematic illustration of the rudder and brake pedal assembly mounted on the cockpit bulkhead of the airplane, according to an embodiment of the invention.
Figure 4:
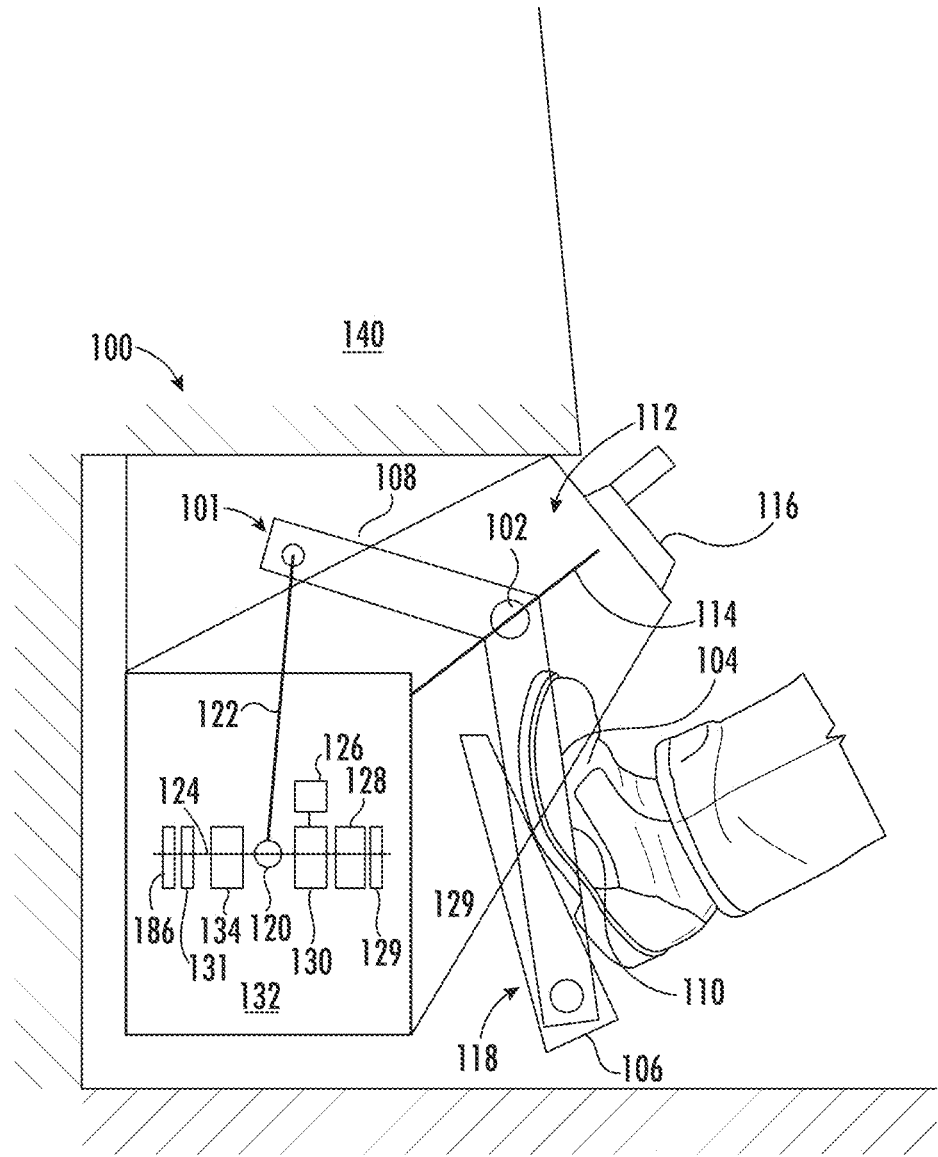
FIG. 4 is a schematic illustration of the rudder and brake pedal assembly mounted directly below the cockpit instrument panel of the airplane, according to an embodiment of the invention.

In certain embodiments, the rudder and brake pedal assembly 100 also includes a housing 132 configured to house the trim mechanism 126, the bellcrank 120, the centering mechanism 130, the load-sensing assembly 128, and the damper assembly 134. In more particular embodiments, the housing includes means for attachment of the rudder and brake pedal assembly to either a cockpit floor 136, a cockpit bulkhead 138, or directly under a cockpit instrument panel 140. FIG. 2 shows an embodiment of the housing 132 in which the rudder and brake pedal assembly 100 is attached to the cockpit floor 136. FIG. 3 shows an embodiment of the housing 132 in which the rudder and brake pedal assembly 100 is attached to the cockpit bulkhead. FIG. 4 shows an embodiment of the housing 132 in which the rudder and brake pedal assembly 100 is attached directly under the cockpit instrument panel 140. The means for attachment of the housing to the cockpit floor 136, the cockpit bulkhead 138, or directly under the cockpit instrument panel 140 includes mechanical fasteners, such as bolts, nuts, screws, anchors, hooks, clamps, and the like.

Figure 5:
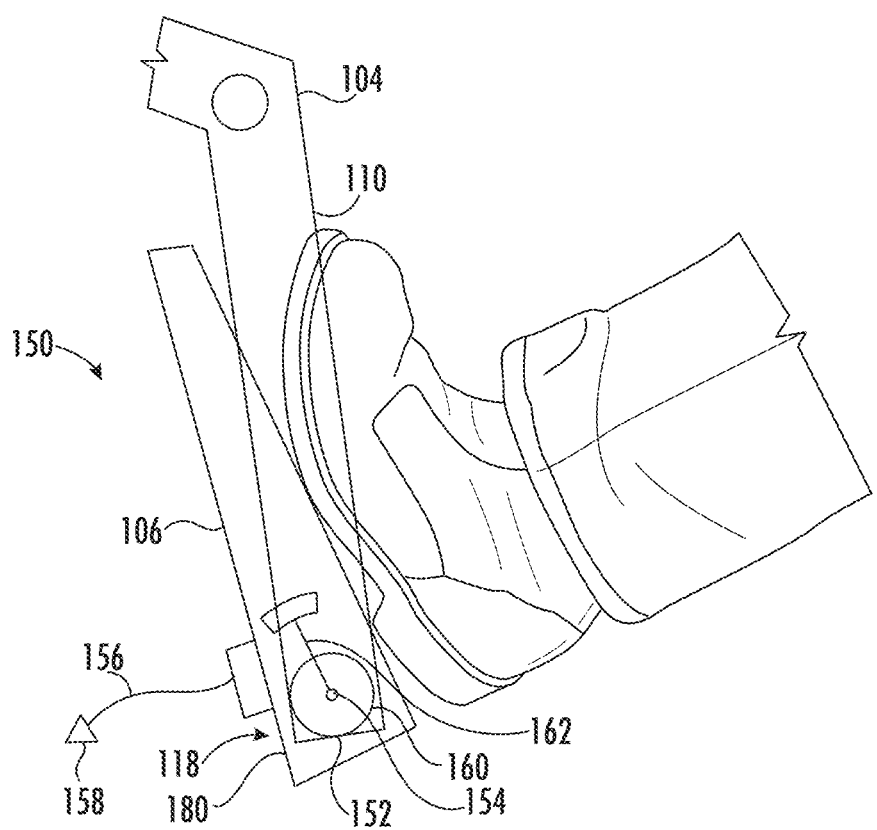
FIGS. 5-7 are schematic illustrations of alternate embodiments of the brake pedal assembly with rotary sensor, according to embodiments of the invention.
Figure 6:
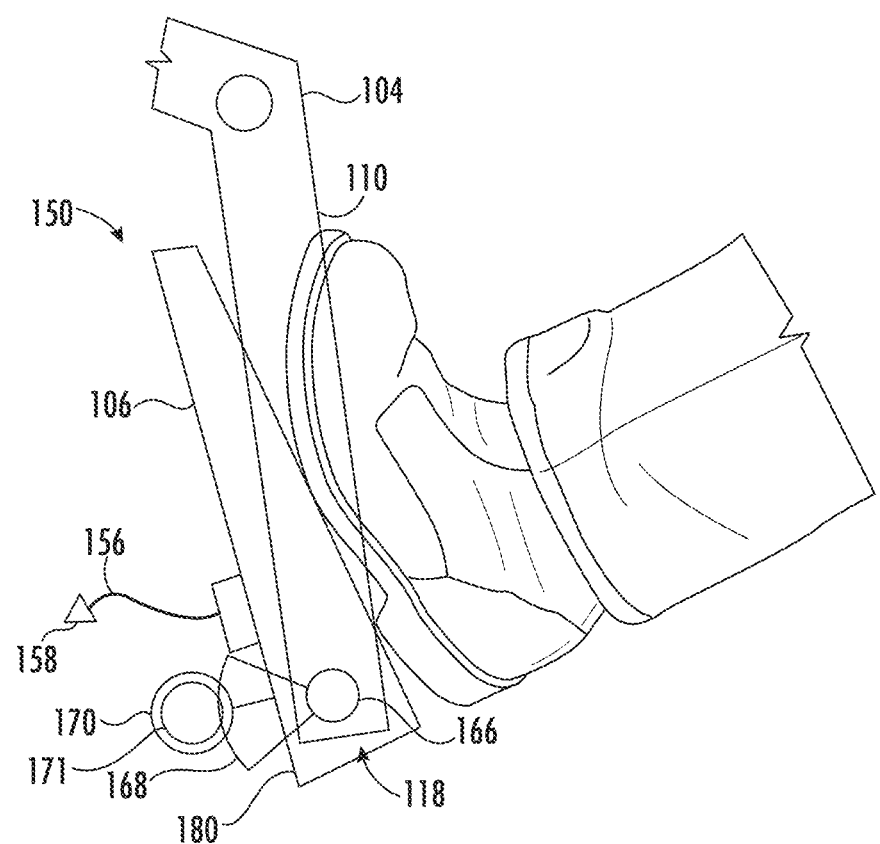
Figure 7:
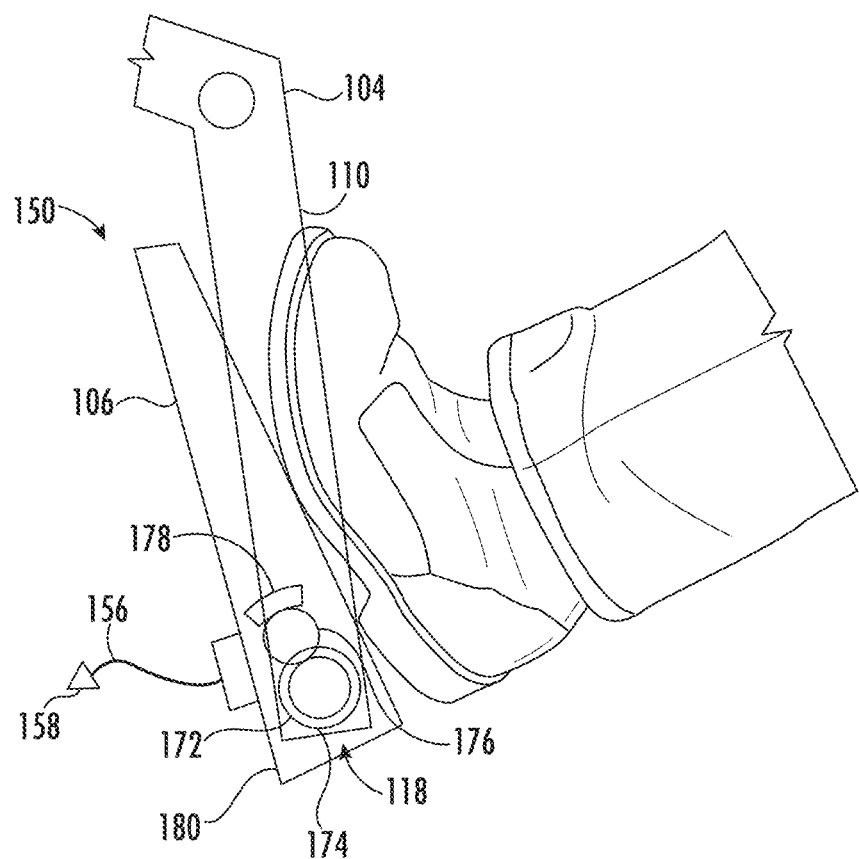

As stated above, the brake pedal 106 is attached to an end of the lower arm portions 110 of each of the rudder arms 104. FIGS. 5-7 show three different embodiments for the brake pedal assembly 150. As shown, the brake pedal assembly 150 includes the brake pedal 106, and, depending on the embodiment, may include at least some portion of a rotary sensor 152 which, in certain embodiments, will be a rotary variable differential transformer (RVDT) sensor, and a sensor cord 156 and connector 158. In certain embodiments, the connector 158 is configured to connect to a mating connector on or near the lower arm portion 110 such that by connecting or disconnecting the sensor cord 156 and connector 158, the entire brake pedal assembly 150 can be attached to or removed from the lower arm portion 110 of the rudder arm 104.

Rotation of the brake pedal 106 at the attachment point 118 operates the wheel brakes of the airplane. The rotary sensor 152 is assembled to both the brake pedal and the lower arm portion at the attachment point. The rotary sensor 152 is configured to determine an extent of the brake pedal rotation.

The motion of the brake pedal 106 is sensed with the rotary sensor 152, which may be oriented on or offset parallel to the connecting axis to rudder arm 104. Springs, dampers and friction devices may be implemented to produce the desired feel. Position sensing may be implemented in several different ways. For example, in an exemplary embodiment, the rotary sensor 152 includes some type of fixed link device that extends from a lever and attaches to either the brake pedal 106 or the rudder arm 104. This particular implementation requires that an axis of the rotary sensor 152 is aligned with the pivot axis of the brake pedal 106 and rudder arm 104. Another implementation may involve the use of spur gearing that interfaces with the brake pedal 106, the rudder arm 104, and the rotary sensor 152. This implementation allows the rotary sensor 152 to be placed on or off the pivot axis. Examples of both implementations are described below, and shown in FIGS. 5-7.

In the embodiment of FIG. 5, the rotary sensor 152 is a fixed link rotary sensor having a sensor housing 160, with a rotating shaft 154, fixed to the lower arm portion 110 at the attachment point 118, and an input lever 162 coupled to the brake pedal 106 and assembled onto the rotating shaft 154 such that rotation of the brake pedal 106 causes the input lever 162 attached rotating shaft 154 to rotate relative to the sensor housing 160. The extent of the input lever rotation is tracked to determine how much braking force is applied to the airplane wheels.

In the embodiment of FIG. 6, the rotary sensor 170 is an offset-sensor rotary sensor attached to pedal 106, and driven by sector gear 168. The sector gear 168 is attached to pedal shaft 166, which is fixed to the lower arm portion 110. A mating gear 171 is fixed to the position sensor shaft. The mating gear 171 engages the sector gear 168 such that rotation of the brake pedal 106 causes the mating gear 171 to travel a distance along the sector gear 168, where the distance is proportional to the extent of the brake pedal rotation, and proportional to the amount of braking force applied to the airplane wheels.

In the embodiment of FIG. 7, the rotary sensor 172 is an on-axis rotary sensor with an input gear 174 and an idler gear 176 fixed to the lower arm portion 110 at the attachment point 118, and an internal sector gear 178 fixed to the brake pedal 106. The idler gear 176 is disposed between and engages the input gear 174, on a first side, and engages the internal sector gear 178 on a second side opposite the first side. Rotation of the brake pedal 106 causes the idler gear 176 and internal sector gear 178 to travel a distance along the input gear 174, where the distance is proportional to the extent of the brake pedal rotation, and proportional to the braking force applied to the airplane wheels.

The aforementioned brake pedal 106 may be biased to a normal position (i.e., where the brake pedal 106 is not rotated at all) by one or more springs 180 attached to the brake pedal 106, In the embodiments shown, there are two springs 180, and there may be a third spring 180 coupled to the rotary sensor 172. The third spring 180 is configured to bias the brake pedal 106 to the normal position in the event of a failure of the two springs 180.

Referring again to FIGS. 1-4, embodiments of the rudder and brake pedal assembly 100 further include an interconnect clevis 186 for connecting the rudder and brake pedal assembly 100 to a second adjacent rudder and brake pedal assembly (not shown). The interconnect clevis 186 operates such that the rotation of the first or second rudder arm 104 of the rudder and brake pedal assembly 100 causes the same rotation of the corresponding rudder arm 104 on the second rudder and brake pedal assembly.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rudder and brake pedal assembly for an airplane, the assembly comprising:
    a rudder arm assembly having a first rudder arm with a first upper arm portion coupled to a first lower arm portion, and having a second rudder arm with a second upper arm portion coupled to a second lower arm portion, the rudder arm assembly being assembled to a beam at an intersection of the first upper and lower arm portions, and at an intersection of the second upper and lower arm portions, the first and second rudder arms configured to rotate about the beam at the intersection, the rotation of the first and second rudder arms configured to adjust those control surfaces used to control a yaw axis of the airplane;
    a brake pedal attached to an end of at least one of the first and second lower arm portions at an attachment point, wherein rotation of the brake pedal at the attachment point operates the wheel brakes of the airplane; and
    a rotary sensor assembled to both the brake pedal and the lower arm portion at the attachment point, the rotary sensor configured to determine an extent of the brake pedal rotation; and
    wherein the rotary sensor is a fixed link rotary sensor comprising:
        a sensor housing, with a rotating shaft, fixed to the lower arm portion at the attachment point; and
        an input lever coupled to the brake pedal and assembled onto the rotating shaft such that rotation of the brake pedal causes the input lever and attached rotating shaft to rotate relative to the sensor housing.

2. The rudder and brake pedal assembly of claim 1, further comprising a housing configured to house a trim mechanism, a bellcrank, a position-sensing mechanism, a friction assembly, a centering mechanism, a load-sensing assembly, and a damper assembly.

3. The rudder and brake pedal assembly of claim 2, wherein the housing includes means for attachment of the rudder and brake pedal assembly to either a cockpit floor, a cockpit bulkhead, or directly under a cockpit instrument panel.

4. The rudder and brake pedal assembly of claim 1, further comprising a bellcrank configured to rotate about a centering hub shaft, the bellcrank having a first end on a first side of the centering hub shaft, and a second end on a second side of the centering hub shaft opposite the first side, the first end being operatively coupled to the first upper arm portion and the second end being operatively coupled to the second upper arm portion, the bellcrank operating such that when the first rudder arm is rotated in a first direction, the second rudder arm is rotated to the same degree as the first rudder arm but in a second direction opposite the first direction.

5. The rudder and brake pedal assembly of claim 1, further comprising a load-sensing assembly having one or more sensors to sense the forces generated by operation of the rudder arm assembly.

6. The rudder and brake pedal assembly of claim 1, wherein the rudder arm assembly is assembled to a translation block configured to move along a guide path, allowing for adjustment of the first and second rudder arms to adjust a position of the brake pedal.

7. The rudder and brake pedal assembly of claim 6, wherein movement of the translation block is effected via a hand wheel, a motor, or a release latch.

8. A rudder and brake pedal assembly for an airplane, the assembly comprising:
    a rudder arm assembly having a first rudder arm with a first upper arm portion coupled to a first lower arm portion, and having a second rudder arm with a second upper arm portion coupled to a second lower arm portion, the rudder arm assembly being assembled to a beam at an intersection of the first upper and lower arm portions, and at an intersection of the second upper and lower arm portions, the first and second rudder arms configured to rotate about the beam at the intersection, the rotation of the first and second rudder arms configured to adjust those control surfaces used to control a yaw axis of the airplane;
    a bellcrank configured to rotate about a centering hub shaft, the bellcrank having a first end on a first side of the centering hub shaft, and a second end on a second side of the centering hub shaft opposite the first side, the first end being operatively coupled to the first upper arm portion and the second end being operatively coupled to the second upper arm portion, the bellcrank operating such that when the first rudder arm is rotated in a first direction, the second rudder arm is rotated to the same degree as the first rudder arm but in a second direction opposite the first direction, the bellcrank being further configured to maintain a fixed position during adjustment of the rudder arm assembly to adjust a position of a brake pedal attached to an end of at least one of the first and second lower arm portions;

a brake pedal assembly having a brake pedal and position sensor to sense a position of the brake pedal, wherein the brake pedal is attached to the first or second rudder arm;

a position-sensing mechanism for sensing a position of the first or second rudder arm;

a trim mechanism coupled to the first and second rudder arms, the trim mechanism configured to adjust those control surfaces used to trim the airplane;

a centering mechanism configured to return the first and second rudder arms to a neutral position;

wherein the brake pedal assembly, trim mechanism, centering mechanism, and position-sensing mechanism are integrated into a single device configured to be positioned below a cockpit instrument panel; and wherein the bellcrank maintains a fixed position relative to the airplane during adjustment of the rudder arm assembly.

9. The rudder and brake pedal assembly of claim 8, wherein the position sensor of the brake pedal assembly is an offset-sensor rotary sensor comprising:
- a sensor housing with an attached sector gear, the sensor housing fixed to the brake pedal;
- a mating gear fixed to the first or second lower arm portion, the mating gear engaging the sector gear such that rotation of the brake pedal causes the mating gear to travel a distance along the sector gear, the distance being proportional to the extent of the brake pedal rotation.

10. The rudder and brake pedal assembly of claim 8, further comprising an interconnect clevis for connecting the rudder and brake pedal assembly to a second adjacent rudder and brake pedal assembly, wherein the interconnect clevis operates such that the rotation of the first or second rudder arm of the rudder and brake pedal assembly causes the same rotation of the corresponding rudder arm on the second rudder and brake pedal assembly, the interconnect clevis being further configured to maintain a fixed position during adjustment of the rudder arm assembly to adjust the position of the brake pedal.

11. The rudder and brake pedal assembly of claim 8, further comprising a housing configured to house the position-sensing mechanism, the centering mechanism, and the trim mechanism, the housing including means for attachment of the rudder and brake pedal assembly to either a cockpit floor, a cockpit bulkhead, or directly below the cockpit instrument panel.

* * * * *